United States Patent
Ruan et al.

(10) Patent No.: US 12,432,099 B2
(45) Date of Patent: Sep. 30, 2025

(54) WI-FI COMMUNICATION METHOD AND DEVICE

(71) Applicant: HUAWEI TECHNOLOGIES CO., LTD., Guangdong (CN)

(72) Inventors: Wei Ruan, Shanghai (CN); Ting wu Wang, Shenzhen (CN); Qian Wang, Shanghai (CN); Dan Wang, Shanghai (CN); Cong Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 35 days.

(21) Appl. No.: 18/314,849

(22) Filed: May 10, 2023

(65) Prior Publication Data
US 2023/0275786 A1    Aug. 31, 2023

Related U.S. Application Data

(63) Continuation of application No. PCT/CN2020/128210, filed on Nov. 11, 2020.

(51) Int. Cl.
*H04L 25/02*  (2006.01)
*H04L 27/34*  (2006.01)

(52) U.S. Cl.
CPC .......... *H04L 25/0242* (2013.01); *H04L 27/34* (2013.01)

(58) Field of Classification Search
CPC ... H04L 25/0242; H04L 27/34; H04L 5/0048; H04L 25/03343; H04L 25/0226
See application file for complete search history.

(56) References Cited

U.S. PATENT DOCUMENTS

| | | |
|---|---|---|
| 2012/0189085 A1 | 7/2012 | Shi |
| 2015/0365257 A1 | 12/2015 | Suh et al. |
| 2017/0237543 A1 | 8/2017 | Lim et al. |
| 2018/0317197 A1* | 11/2018 | Kasher ............... G01S 5/12 |
| 2019/0334566 A1 | 10/2019 | Suh et al. |
| 2021/0281457 A1* | 9/2021 | Eger ............... H04W 72/23 |

(Continued)

FOREIGN PATENT DOCUMENTS

| | | | |
|---|---|---|---|
| CN | 107078880 A | | 8/2017 |
| MY | 202697 A | * | 5/2015 |

OTHER PUBLICATIONS

Machine translation of WO-2021114053-A1 (Year: 2021).*

(Continued)

*Primary Examiner* — Jean B Corrielus

(57) ABSTRACT

A Wi-Fi communication method and a device are disclosed, and relate to the field of wireless communication technologies. According to the method, a first communication device is configured to: generate a physical frame, and send the physical frame. The physical frame includes signaling information and a plurality of training sequences used for channel estimation, the signaling information indicates a quantity of space-time streams and a quantity of the plurality of training sequences, and the quantity of the plurality of training sequences is greater than the quantity of space-time streams. This helps improve accuracy of an algorithm such as channel estimation in a communication system, to improve a demodulation capability of a communication device, and ensure data demodulation effect.

20 Claims, 4 Drawing Sheets

(56) References Cited

U.S. PATENT DOCUMENTS

2021/0306181 A1* 9/2021 Agrawal .............. H04B 7/0617

OTHER PUBLICATIONS

Rui Cao et al:"EHT NLTF Design." IEEE 802.11-20/1375r1, Aug. 27, 2020. XP068173534, total 17 pages.

Extended European Search Report issued in EP20961078.1, dated Oct. 25, 2023, 9 pages.

IEEE Std 802.11-2016, IEEE Standard for Information technology Telecommunications and information exchange between systems Local and metropolitan area networks Specific requirements Part 11: Wireless LAN Medium Access Control (MAC) and Physical Layer (PHY) Specifications, Dec. 7, 2016, total 3534 pages.

IEEE Std 802.11a-1999, Supplement to IEEE Standard for Information technology Telecommunications and information exchange between systems Local and metropolitan area networks Specific requirements Part 11: Wireless LAN Medium Access Control (MAC) and Physical Layer (PHY) specifications: High-speed Physical Layer in the 5 GHZ Band, Sep. 16, 1999, total 90 pages.

IEEE Std 802.11b-1999, Supplement to IEEE Standard forInformation technology Telecommunications and information exchange between systems Local and metropolitan area networks Specific requirements Part 11: Wireless LAN Medium Access Control (MAC) and Physical Layer (PHY) specifications: Higher-Speed Physical Layer Extension in the 2.4 GHz Band, Sep. 16, 1999, total 97 pages.

IEEE Std 802.11g-2003, IEEE Standard for Information technology Telecommunications and information exchange between systems Local and metropolitan area networks Specific requirements Part 11: Wireless LAN Medium Access Control (MAC) and Physical Layer (PHY) specifications Amendment 4: Further Higher Data Rate Extension in the 2.4 GHz Band, Jun. 12, 2003, total 77 pages.

IEEE Std 802.11n-2009, IEEE Standard for Information technology Telecommunications and information exchange between systems Local and metropolitan area networks Specific requirements Part 11: Wireless LAN Medium Access Control (MAC) and Physical Layer (PHY) Specifications Amendment 5: Enhancements for Higher Throughput, Sep. 11, 2009, total 536 pages.

IEEE Std 802.11ac-2013, IEEE Standard for Information technology Telecommunications and information exchange between systems Local and metropolitan area networks Specific requirements Part 11: Wireless LAN Medium Access Control (MAC) and Physical Layer (PHY) Specifications Amendment 4: Enhancements for Very High Throughput for Operation in Bands below 6 GHZ, Dec. 11, 2013, total 425 pages.

IEEE P802.11ax/D8.0, Draft Standard for Information technology Telecommunications and information exchange between systems Local and metropolitan area networks Specific requirements Part 11: Wireless LAN Medium Access Control (MAC) and Physical Layer (PHY) Specifications Amendment 1: Enhancements for High Efficiency WLAN, Oct. 2020, total 820 pages.

International Search Report and Written Opinion issued in PCT/CN2020/128210, dated Aug. 12, 2021, 8 pages.

* cited by examiner

WI-FI COMMUNICATION METHOD AND DEVICE

CROSS-REFERENCE TO RELATED APPLICATIONS

This application is a continuation of International Application No. PCT/CN2020/128210, filed on Nov. 11, 2020, the disclosure of which is hereby incorporated by reference in its entirety.

TECHNICAL FIELD

The present disclosure relates to the field of wireless communication technologies, and in particular, to a Wi-Fi communication method and a device.

BACKGROUND

With popularization of wireless local area network (WLAN) technologies and intelligent terminals, more people start getting used to working by using smartphones and tablet computers.

Wi-Fi, also referred to as a "wireless hotspot" or a "wireless network", is a WLAN technology based on a next-generation institute of electrical and electronics engineers (IEEE) 802.11 standard. Wi-Fi has become the first choice for more users to access networks and tends to gradually replace wired access. To adapt to new service applications and reduce a gap with a wired network bandwidth, in six generations of Wi-Fi systems (including 802.11, 802.11b, 802.11a/g, 802.11n, 802.11ac, and 802.11ax) that have been developed and popularized, each generation of IEEE 802.11 standard proposes a plurality of communication technologies, such as an orthogonal frequency division multiplexing (OFDM) technology, a multiple-input multiple-output (MIMO) technology, and a transmit beamforming (TxBF) channel detection mechanism, to improve a rate and spectrum utilization of the standard.

However, because performance of a wireless communication system is greatly affected by a wireless channel, such as shadow fading and frequency selective fading, a propagation path between a transmitter and a receiver is very complex. Unlike a wired channel, the wireless channel is neither fixed nor predictable, but has great randomness. This poses a great challenge to design of a receiver. To accurately restore a transmitted signal of a transmitter end at a receiver end, people use various measures to resist impact of multipath effect on the transmitted signal.

At present, during coherent detection of an OFDM system, channel estimation needs to be performed, and whether detailed channel information can be obtained to correctly demodulate a transmitted signal at a receiver is an important indicator for measuring performance of a wireless communication system. With development and popularization of wireless communication systems, a supported modulation scheme is increasingly high, and correspondingly, a signal-to-noise ratio (SNR) required for demodulation is also increasingly high. However, how to perform channel estimation noise reduction is still one of difficulties that need to be urgently resolved.

SUMMARY

The present disclosure provides a Wi-Fi communication method and a device, to help improve accuracy of channel estimation in a communication system, thereby improving a demodulation capability of a communication device serving as a receive end.

According to a first aspect, an embodiment of the present disclosure provides a Wi-Fi communication method. The method may be applied to a first communication device, and the first communication device may be a transmit end or a receive end during information exchange. When the first communication device serves as a transmit end, in the method, the first communication device may generate a first physical frame, and send the first physical frame to a second communication device. The first physical frame includes signaling information and a plurality of training sequences used for channel estimation, the signaling information indicates a quantity of space-time streams and a quantity of the plurality of training sequences, and the quantity of the plurality of training sequences is greater than the quantity of space-time streams.

According to this solution, in a scenario in which channel estimation or the like needs to be performed, the quantity of training sequences that are included in the first physical frame generated by the first communication device and that are used for channel estimation may be greater than the quantity of space-time streams, and the signaling information may be used to indicate the quantity of space-time streams and the quantity of the plurality of training sequences. Therefore, the second communication device receiving the first physical frame can know the quantity of space-time streams and the quantity of training sequences, and obtain more training sequences, so that accuracy of a related algorithm can be improved when processing such as channel estimation or frequency offset/phase tracking is performed based on the plurality of obtained training sequences, thereby helping improve a demodulation capability of the second communication device, and ensure a data demodulation effect.

In a possible implementation, the quantity of the plurality of training sequences is an integer multiple of the quantity of space-time streams.

According to this solution, to improve channel estimation noise reduction, the quantity of training sequences may be designed as an integer multiple of the quantity of space-time streams. Therefore, the quantity of training sequences is increased, so that the second communication device can obtain more training sequences, to improve accuracy of a related algorithm, thereby helping improve a demodulation capability of a receive end communication device, and ensure a data demodulation effect.

In a possible implementation, the plurality of training sequences is obtained by precoding, based on a precoding matrix, time domain symbols corresponding to the space-time streams, where the precoding matrix is an M×N matrix, M is the quantity of space-time streams, N is the quantity of the plurality of training sequences, and M and N are positive integers.

According to this solution, because a quantity of rows of the used precoding matrix corresponds to the quantity of space-time streams, and a quantity of columns of the precoding matrix corresponds to the quantity of the plurality of training sequences, after the time domain symbols of the space-time streams are precoded based on the precoding matrix, the plurality of training sequences corresponding to the time domain symbols of the space-time streams can be correspondingly obtained. Therefore, the quantity of training sequences in the to-be-generated first frame is increased, to implement channel estimation noise reduction.

In a possible implementation, row vectors in the precoding matrix are orthogonal; and/or elements in an $(M+1)^{th}$ column to an $N^{th}$ column are the same as elements in the first column to a $j^{th}$ column in the precoding matrix, and the row vectors in the precoding matrix are orthogonal, where j is equal to N–M.

According to this solution, when the quantity of training sequences is increased and the row vectors in the precoding matrix are orthogonal, the second communication device receiving the first frame can obtain more training sequences, to improve accuracy of a channel estimation algorithm, thereby improving demodulation performance of the device, and ensuring a data demodulation effect.

In this embodiment, to obtain the precoding matrix, for example, a reference matrix may be preset. The precoding matrix may be a matrix including elements in first M rows and first N columns in the preset reference matrix; or the precoding matrix may be obtained by reconstructing elements in the first M rows and first j columns in the reference matrix, and j is equal to N–M, where the reference matrix is obtained by concatenating at least two specified matrices P, and the matrix P is a predefined matrix used to precode the time domain symbols corresponding to the space-time streams.

In this embodiment, the matrix P may be configured or obtained based on an application scenario, a service requirement, an algorithm, or the like. For example, the matrix P may be self-defined, or may be a 4-row and 4-column matrix specified in a Wi-Fi communication protocol. Elements in the matrix P may be shown as follows:

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

In a possible implementation, before the first physical frame is generated, the method further includes: determining the precoding matrix based on the quantity of space-time streams, the quantity of the plurality of training sequences, and preset frame format configuration information.

According to this solution, frame format configuration information may be preconfigured based on an application scenario, a service requirement, or the like. When the first communication device needs to generate the first physical frame, the first communication device may determine the to-be-used precoding matrix based on the frame format configuration information, to obtain more training sequences used for channel estimation, and generate the first physical frame.

In a possible implementation, when the first physical frame is sent to the second communication device, transmit power of at least one of the plurality of training sequences is greater than transmit power of an original training sequence of the training sequence.

According to this solution, power of some of the training sequences is increased to improve accuracy of an algorithm, such as channel estimation or frequency offset/phase tracking, performed by a receive end communication device, thereby helping improve a demodulation capability of the receive device.

In a possible implementation, a transmission resource that carries at least one of the plurality of training sequences further carries data that needs to be transmitted.

According to this solution, data (for example, data with a relatively low modulation and coding rate) that needs to be transmitted is carried in some of transmission resources that carry increased training sequences, to reduce impact on some content located behind the training sequences in the frame, and reduce, as much as possible, cases in which transmitted data is reduced due to an increase in training sequences.

In a possible implementation, the first physical frame is a frame generated when a transmit beamforming TxBF technology is used and a used modulation scheme is higher than or equal to 4K quadrature amplitude modulation.

In this manner, in a scenario in which the TxBF technology and a higher order modulation scheme such as 4K QAM are used, a demodulation capability of a communication device can be improved, and a data demodulation effect can be ensured.

In a possible implementation, the signaling information is located in a reserved field in the first physical frame, and the plurality of training sequences are located in a training sequence field in the first physical frame.

According to a second aspect, an embodiment of the present disclosure further provides a Wi-Fi communication method. The method may be applied to a second communication device, and the second communication device may be a transmit end and a receive end during information exchange. When the second communication device serves as a receive end, in the method, the second communication device may receive a first physical frame from a first communication device, where the first physical frame includes signaling information and a plurality of training sequences used for channel estimation, the signaling information indicates a quantity of space-time streams and a quantity of the plurality of training sequences, and the quantity of the plurality of training sequences is greater than the quantity of space-time streams; and perform channel estimation or frequency offset/phase tracking based on the signaling information and the plurality of training sequences that are included in the first physical frame.

According to this solution, the second communication device may further serve as a receive end to receive the first physical frame from the first communication device, and improve accuracy of an algorithm such as channel estimation or frequency offset/phase tracking by using information included in the first physical frame, thereby helping improve a demodulation capability of the second communication device, and ensure a data demodulation effect.

In a possible implementation, the performing channel estimation or frequency offset/phase tracking based on the signaling information and the plurality of training sequences that are included in the first physical frame includes: determining a precoding matrix based on preset frame format configuration information, and the quantity of space-time streams and the quantity of the plurality of training sequences that are included in the signaling information, where the precoding matrix is an M×N matrix, M is the quantity of space-time streams, N is the quantity of the plurality of training sequences, and M and N are positive integers; and after processing the plurality of training sequences based on the precoding matrix, performing channel estimation or frequency offset/phase tracking by using a plurality of training sequences obtained after processing.

In a possible implementation, the quantity of the plurality of training sequences is an integer multiple of the quantity of space-time streams.

In a possible implementation, row vectors in the precoding matrix are orthogonal; and/or elements in an $(M+1)^{th}$ column to an $N^{th}$ column are the same as elements in the first column to a $j^{th}$ column in the precoding matrix, and the row vectors in the precoding matrix are orthogonal, where j is equal to N−M.

In a possible implementation, the precoding matrix is a matrix including elements in first M rows and first N columns in a preset reference matrix; or the precoding matrix is obtained by reconstructing elements in the first M rows and first j columns in the reference matrix, and j is equal to N−M, where the reference matrix is obtained by concatenating at least two specified matrices P, and the matrix P is a predefined matrix used to precode time domain symbols corresponding to the space-time streams.

In a possible implementation, the matrix P is a 4-row and 4-column matrix specified in a Wi-Fi communication protocol, and elements in the matrix P are shown as follows:

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

In a possible implementation, a transmission resource that carries at least one of the plurality of training sequences further carries data that needs to be transmitted.

In a possible implementation, the first physical frame is a frame generated when a transmit beamforming (TxBF) technology is used and a used modulation scheme is higher than or equal to 4K quadrature amplitude modulation (QAM).

In a possible implementation, the signaling information is located in a reserved field in the first physical frame, and the plurality of training sequences are located in a training sequence field in the first physical frame.

According to a third aspect, an embodiment of the present disclosure further provides a Wi-Fi communication apparatus, including: a processing unit, configured to generate a first physical frame, where the first physical frame includes signaling information and a plurality of training sequences used for channel estimation, the signaling information indicates a quantity of space-time streams and a quantity of the plurality of training sequences, and the quantity of the plurality of training sequences is greater than the quantity of space-time streams; and a transceiver unit, configured to send the first physical frame to a second communication device.

In a possible implementation, the quantity of the plurality of training sequences is an integer multiple of the quantity of space-time streams.

In a possible implementation, the plurality of training sequences are obtained by precoding, based on a precoding matrix, time domain symbols corresponding to the space-time streams, where the precoding matrix is an M×N matrix, M is the quantity of space-time streams, N is the quantity of the plurality of training sequences, and M and N are positive integers.

In a possible implementation, row vectors in the precoding matrix are orthogonal; and/or elements in an $(M+1)^{th}$ column to an $N^{th}$ column are the same as elements in the first column to a $j^{th}$ column in the precoding matrix, and the row vectors in the precoding matrix are orthogonal, where j is equal to N−M.

In a possible implementation, the precoding matrix is a matrix including elements in first M rows and first N columns in a preset reference matrix; or the precoding matrix is obtained by reconstructing elements in the first M rows and first j columns in the reference matrix, and j is equal to N−M, where the reference matrix is obtained by concatenating at least two specified matrices P, and the matrix P is a predefined matrix used to precode the time domain symbols corresponding to the space-time streams.

In a possible implementation, the matrix P is a 4-row and 4-column matrix specified in a Wi-Fi communication protocol, and elements in the matrix P are shown as follows:

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

In a possible implementation, before generating the first physical frame, the processing unit is further configured to determine the precoding matrix based on the quantity of space-time streams, the quantity of the plurality of training sequences, and preset frame format configuration information.

In a possible implementation, when the transceiver unit sends the first physical frame to the second communication device, transmit power of at least one of the plurality of training sequences is greater than transmit power of an original training sequence of the training sequence.

In a possible implementation, a transmission resource that carries at least one of the plurality of training sequences further carries data that needs to be transmitted.

In a possible implementation, the first physical frame is a frame generated when a transmit beamforming (TxBF) technology is used and a used modulation scheme is higher than or equal to 4K quadrature amplitude modulation (QAM).

In a possible implementation, the signaling information is located in a reserved field in the first physical frame, and the plurality of training sequences are located in a training sequence field in the first physical frame.

According to a fourth aspect, an embodiment of the present disclosure further provides a Wi-Fi communication apparatus, including: a transceiver unit, configured to receive a first physical frame from a first communication device, where the first physical frame includes signaling information and a plurality of training sequences used for channel estimation, the signaling information indicates a quantity of space-time streams and a quantity of the plurality of training sequences, and the quantity of the plurality of training sequences is greater than the quantity of space-time streams; and a processing unit, configured to perform channel estimation or frequency offset/phase tracking based on the signaling information and the plurality of training sequences that are included in the first physical frame.

In a possible implementation, the processing unit is configured to: determine a precoding matrix based on preset frame format configuration information, and the quantity of space-time streams and the quantity of the plurality of training sequences that are included in the signaling information, where the precoding matrix is an M×N matrix, M is the quantity of space-time streams, N is the quantity of the plurality of training sequences, and M and N are positive integers; and after processing the plurality of training sequences based on the precoding matrix, perform channel estimation or frequency offset/phase tracking by using a plurality of training sequences obtained after processing.

In a possible implementation, the quantity of the plurality of training sequences is an integer multiple of the quantity of space-time streams.

In a possible implementation, row vectors in the precoding matrix are orthogonal; and/or elements in an $(M+1)^{th}$ column to an $N^{th}$ column are the same as elements in the first column to a $j^{th}$ column in the precoding matrix, and the row vectors in the precoding matrix are orthogonal, where j is equal to N−M.

In a possible implementation, the precoding matrix is a matrix including elements in first M rows and first N columns in a preset reference matrix; or the precoding matrix is obtained by reconstructing elements in the first M rows and first j columns in the reference matrix, and j is equal to N−M, where the reference matrix is obtained by concatenating at least two specified matrices P, and the matrix P is a predefined matrix used to precode time domain symbols corresponding to the space-time streams.

In a possible implementation, the matrix P is a 4-row and 4-column matrix specified in a Wi-Fi communication protocol, and elements in the matrix P are shown as follows:

$$P_{4\times4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

In a possible implementation, a transmission resource that carries at least one of the plurality of training sequences further carries data that needs to be transmitted.

In a possible implementation, the first physical frame is a frame generated when a transmit beamforming (TxBF) technology is used and a used modulation scheme is higher than or equal to 4K quadrature amplitude modulation (QAM).

In a possible implementation, the signaling information is located in a reserved field in the first physical frame, and the plurality of training sequences are located in a training sequence field in the first physical frame.

According to a fifth aspect, an embodiment of the present disclosure further provides a first communication device, including: a processor, configured to generate a first physical frame, where the first physical frame includes signaling information and a plurality of training sequences used for channel estimation, the signaling information indicates a quantity of space-time streams and a quantity of the plurality of training sequences, and the quantity of the plurality of training sequences is greater than the quantity of space-time streams; and a transceiver, coupled to the processor, and configured to send the first physical frame to a second communication device.

In a possible implementation, the quantity of the plurality of training sequences is an integer multiple of the quantity of space-time streams.

In a possible implementation, the plurality of training sequences are obtained by precoding, based on a precoding matrix, time domain symbols corresponding to the space-time streams, where the precoding matrix is an M×N matrix, M is the quantity of space-time streams, N is the quantity of the plurality of training sequences, and M and N are positive integers.

In a possible implementation, row vectors in the precoding matrix are orthogonal; and/or elements in an $(M+1)^{th}$ column to an $N^{th}$ column are the same as elements in the first column to a $j^{th}$ column in the precoding matrix, and the row vectors in the precoding matrix are orthogonal, where j is equal to N−M.

In a possible implementation, the precoding matrix is a matrix including elements in first M rows and first N columns in a preset reference matrix; or the precoding matrix is obtained by reconstructing elements in the first M rows and first j columns in the reference matrix, and j is equal to N−M, where the reference matrix is obtained by concatenating at least two specified matrices P, and the matrix P is a predefined matrix used to precode the time domain symbols corresponding to the space-time streams.

In a possible implementation, the matrix P is a 4-row and 4-column matrix specified in a Wi-Fi communication protocol, and elements in the matrix P are shown as follows:

$$P_{4\times4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

In a possible implementation, before generating the first physical frame, the processor is further configured to determine the precoding matrix based on the quantity of space-time streams, the quantity of the plurality of training sequences, and preset frame format configuration information.

In a possible implementation, when the transceiver sends the first physical frame to the second communication device, transmit power of at least one of the plurality of training sequences is greater than transmit power of an original training sequence of the training sequence.

In a possible implementation, a transmission resource that carries at least one of the plurality of training sequences further carries data that needs to be transmitted.

In a possible implementation, the first physical frame is a frame generated when a transmit beamforming (TxBF) technology is used and a used modulation scheme is higher than or equal to 4 K quadrature amplitude modulation (QAM).

In a possible implementation, the signaling information is located in a reserved field in the first physical frame, and the plurality of training sequences are located in a training sequence field in the first physical frame.

According to a sixth aspect, an embodiment of the present disclosure further provides a second communication device, including: a transceiver, configured to receive a first physical frame from a first communication device, where the first physical frame includes signaling information and a plurality of training sequences used for channel estimation, the signaling information indicates a quantity of space-time streams and a quantity of the plurality of training sequences, and the quantity of the plurality of training sequences is greater than the quantity of space-time streams; and a processor, coupled to the transceiver, and configured to perform channel estimation or frequency offset/phase tracking based on the signaling information and the plurality of training sequences that are included in the first physical frame.

In a possible implementation, the processor is configured to: determine a precoding matrix based on preset frame format configuration information, and the quantity of space-time streams and the quantity of the plurality of training sequences that are included in the signaling information, where the precoding matrix is an M×N matrix, M is the quantity of space-time streams, N is the quantity of the plurality of training sequences, and M and N are positive integers; and after processing the plurality of training sequences based on the precoding matrix, perform channel estimation or frequency offset/phase tracking by using a plurality of training sequences obtained after processing.

In a possible implementation, the quantity of the plurality of training sequences is an integer multiple of the quantity of space-time streams.

In a possible implementation, row vectors in the precoding matrix are orthogonal; and/or elements in an $(M+1)^{th}$ column to an $N^{th}$ column are the same as elements in the first column to a $j^{th}$ column in the precoding matrix, and the row vectors in the precoding matrix are orthogonal, where j is equal to N−M.

In a possible implementation, the precoding matrix is a matrix including elements in first M rows and first N columns in a preset reference matrix; or the precoding matrix is obtained by reconstructing elements in the first M rows and first j columns in the reference matrix, and j is equal to N−M, where the reference matrix is obtained by concatenating at least two specified matrices P, and the matrix P is a predefined matrix used to precode time domain symbols corresponding to the space-time streams.

In a possible implementation, the matrix P is a 4-row and 4-column matrix specified in a Wi-Fi communication protocol, and elements in the matrix P are shown as follows:

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

In a possible implementation, a transmission resource that carries at least one of the plurality of training sequences further carries data that needs to be transmitted.

In a possible implementation, the first physical frame is a frame generated when a transmit beamforming (TxBF) technology is used and a used modulation scheme is higher than or equal to 4K quadrature amplitude modulation (QAM).

In a possible implementation, the signaling information is located in a reserved field in the first physical frame, and the plurality of training sequences are located in a training sequence field in the first physical frame.

According to a seventh aspect, an embodiment of the present disclosure further provides a communication system, including the Wi-Fi communication apparatus according to any one of the third aspect and the possible implementations of the third aspect and the Wi-Fi communication apparatus according to any one of the fourth aspect and the possible implementations of the fourth aspect, or including the first communication device according to any one of the fifth aspect and the possible implementations of the fifth aspect and the second communication device according to any one of the sixth aspect and the possible implementations of the sixth aspect.

According to an eighth aspect, an embodiment of the present disclosure further provides a computer-readable storage medium. The computer-readable storage medium stores a computer program. When the computer program is run on a computer, the computer is enabled to perform the method according to the first aspect or the second aspect.

According to a ninth aspect, an embodiment of the present disclosure further provides a computer program product. When the computer program product runs on a computer, the computer is enabled to perform the method according to the first aspect or the second aspect.

According to a tenth aspect, an embodiment of the present disclosure further provides a chip. The chip is configured to read a computer program stored in a memory, to perform the method according to either the first aspect or the second aspect.

According to an eleventh aspect, an embodiment of the present disclosure further provides a chip system. The chip system includes a processor, configured to support a computer apparatus in implementing the method according to either the first aspect or the second aspect. In a possible design, the chip system further includes a memory. The memory is configured to store a program and data that are necessary for the computer apparatus. The chip system may include a chip, or may include a chip and another discrete component.

DESCRIPTION OF EMBODIMENTS

Figure 1:
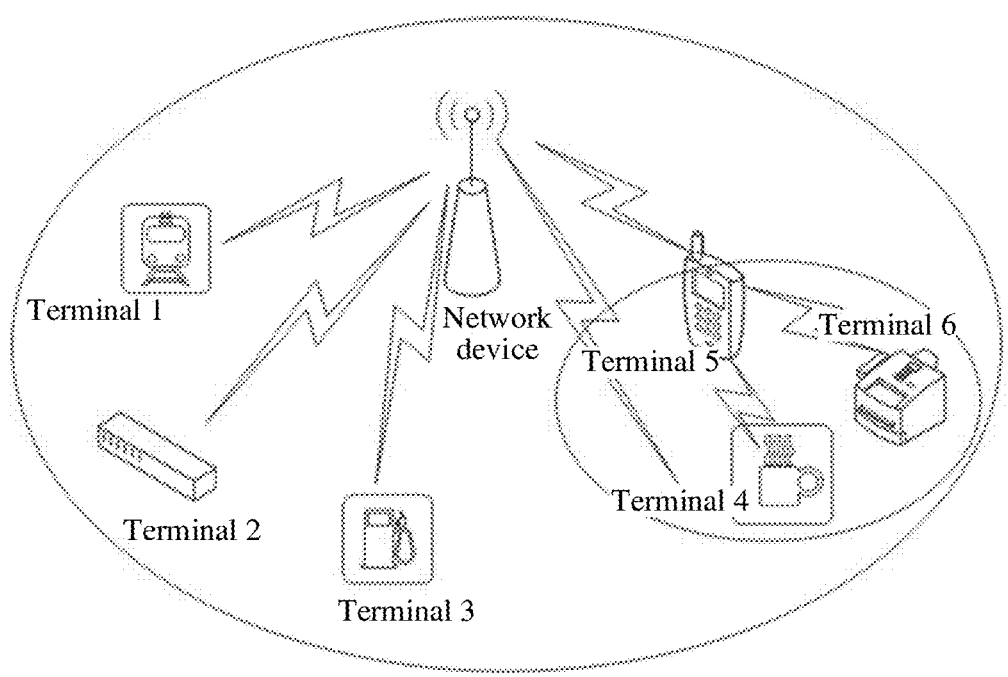
FIG. 1 is a schematic diagram of a structure of a communication system according to an embodiment of the present disclosure.

To resolve the problem mentioned in the background, embodiments of the present disclosure provide a solution. The solution may be applied to a communication device in a communication system. The communication device may be a network device and/or a terminal device in the communication system, and may serve as a transmit end and/or a receive end. For ease of distinguishing, in the following embodiments of the present disclosure, a communication device serving as a transmit end is referred to as a first communication device, and a communication device serving as a receive end is referred to as a second communication device. It may be understood that, in the embodiments of the present disclosure, this is merely intended for distinguishing and constitutes no limitation on a function of the communication device. In other embodiments, the first communication device may alternatively serve as a receive end, and the second communication device may alternatively serve as a transmit end. This is not limited in the present disclosure.

In this solution, a first physical frame sent by the first communication device to the second communication device includes signaling information and a plurality of training sequences used for channel estimation, the signaling information may be used to indicate a quantity of space-time streams and a quantity of the plurality of training sequences, and the quantity of the plurality of training sequences is greater than the quantity of space-time streams. In this way, when receiving the first physical frame, the second communication device may know the quantity of space-time streams, the quantity of the plurality of training sequences, and the plurality of training sequences, and then may obtain, based on the quantity of space-time streams and the quantity of the plurality of training sequences, a precoding matrix used to process the training sequences, and perform algorithm processing such as channel estimation or frequency offset/phase tracking based on a plurality of training sequences obtained after processing, thereby improving demodulation performance of the second communication device, and ensuring a data demodulation effect. The quantity of training sequences used for channel estimation is greater than the quantity of space-time streams, so that the second communication device receiving the first physical frame can obtain more training sequences. Therefore, accuracy of an algorithm such as channel estimation or frequency offset/phase tracking can be improved, thereby helping improve a demodulation capability of the receive device.

To make objectives, technical solutions, and advantages of the embodiments of the present disclosure clearer, the following further describes the embodiments of the present disclosure in detail with reference to the accompanying drawings.

The technical solutions in the embodiments of the present disclosure may be applied to various communication systems, for example, a massive multiple-input multiple-output (massive MIMO) system, a long term evolution (LTE) system, an LTE time division duplex (TDD) system, an LTE frequency division duplex (FDD) system, a 5th generation (5G) mobile communication system, or a new radio (NR) system, or applied to a future communication system or another similar communication system such as a 6G system. For example, the technical solutions in the embodiments of the present disclosure may be applied to networking scenarios such as uplink and downlink decoupling, carrier aggregation (CA), and dual connectivity (DC) of the foregoing various communication systems.

FIG. 1 is a schematic diagram of a structure of a communication system according to an embodiment of the present disclosure. The communication system includes a network device and at least one terminal device (for example, terminals 1 to 6 shown in FIG. 1). The network device may communicate with at least one terminal device (for example, the terminal 1) by using an uplink (UL) and a downlink (DL). The uplink is a communication link from the terminal device to the network device, and the downlink is a communication link from the network device to the terminal device.

Optionally, the network device and the terminal device each may have a plurality of transmit antennas and a plurality of receive antennas, and the network device may communicate with at least one terminal device by using, for example, a MIMO technology.

It should be understood that alternatively, there may be a plurality of network devices in the communication system, and one network device may provide a service for a plurality of terminal devices. A quantity of network devices included in the communication system and a quantity of terminal devices included in the communication system are not limited in embodiments of the present disclosure. The network device and each of some or all of the at least one terminal device in FIG. 1 may implement the technical solutions provided in the embodiments of the present disclosure. In addition, various terminal devices shown in FIG. 1 are merely some examples of the terminal device. It should be understood that the terminal device in the embodiments of the present disclosure is not limited thereto.

The solutions provided in the embodiments of the present disclosure may be applied to the network device or the terminal device in the communication system.

The network device in the embodiments of the present disclosure is also referred to as an access network device, and is a device that is in a network and that is configured to connect a terminal device to a wireless network. The network device may be a node in a radio access network, and may also be referred to as a base station or a RAN node (or device). The network device may be an evolved NodeB (eNodeB) in an LTE system or an LTE-Advanced (LTE-A) system, may be a next generation NodeB (gNodeB) in a 5G NR system, may be a NodeB (Node B, NB), a base station controller (BSC), a base transceiver station (BTS), a transmission reception point (TRP), a home base station (for example, a home evolved NodeB, or a home Node B, HNB), a baseband unit (BBU), a WiFi access point (AP), a relay node, an integrated access and backhaul (IAB) node, a base station in a future mobile communication system, or the like, or may be a central unit (CU) and a distributed unit (DU). This is not limited in the embodiments of the present disclosure. In a split deployment scenario in which the access network device includes the CU and the DU, the CU supports protocols such as radio resource control (RRC), a packet data convergence protocol (PDCP), and a service data adaptation protocol (SDAP); and the DU mainly supports a radio link control (RLC) layer protocol, a medium access control (MAC) layer protocol, and a physical layer protocol.

The terminal device in the embodiments of the present disclosure is a device having a wireless transceiver function. For example, the device may be deployed on land, and includes an indoor or outdoor device, a handheld device, a wearable device, or a vehicle-mounted device, may be deployed on a water surface (for example, on a ship), or may be deployed in the air (for example, on a plane, a balloon, or a satellite). The terminal device may communicate with a core network through a radio access network (RAN), and exchange voice and/or data with the RAN. The terminal device may be a mobile phone, a tablet computer, a computer having a wireless transceiver function, a mobile internet device, a wearable device, a virtual reality terminal device, an augmented reality terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in the embodiments of the present disclosure. Sometimes, the terminal device may also be referred to as user equipment (UE), a mobile station, a remote station, and the like. A specific technology, a device form, and a name that are used by the terminal device are not limited in the embodiments of the present disclosure. A carrier (that may also be referred to as a carrier frequency) in the embodiments of the present disclosure is a radio wave having a particular frequency and a specific bandwidth (for example, 10 M), and is used to carry a to-be-transmitted radio signal. A frequency band is some spectrum resources used in wireless communication, for example, an 1800 M frequency band used in an LTE system. Usually, one frequency band includes a plurality of carriers. For example, if a bandwidth of the 1800 M frequency band is 75 M, the frequency band may include m (m≥1) carriers whose bandwidth is 20 M and n (n>1) carriers whose bandwidth is 10 M. Certainly, there may be alternatively other possible carrier division manners. This is not limited in the present disclosure. In the present disclosure, one receive channel or transmit channel may process a signal that includes at least one carrier.

It should be noted that, in the following description of the embodiments of the present disclosure, a communication device configured to generate and send a frame may also be referred to as a transmit end communication device or a transmit device, and a communication device configured to receive and parse a frame may also be referred to as a receive end communication device or a receive device. It may be understood that, in the embodiments of the present disclosure, communication devices are distinguished merely based on a frame sending or frame receiving function, but no limitation is constituted on a function of the communication device.

It should be noted that, in the following description of the embodiments of the present disclosure, a matrix is represented by using an uppercase bold letter, a vector is represented by using a lowercase bold letter, and $(\cdot)^H$, $(\cdot)^T$, and $(\cdot)^*$ are used to represent transformation for calculating a conjugate transpose, transpose, or complex conjugate of a matrix/vector.

It should be noted that, in the embodiments of the present disclosure, the terms "system" and "network" may be interchangeably used. The term "a plurality of" means two or more. In view of this, in the embodiments of the present disclosure, "a plurality of" may also be understood as "at least two". The term "at least one" may be understood as one or more, for example, one, two, or more. For example, "include at least one" means "include one, two, or more", and there is no limitation on which is included. For example, if at least one of A, B, and C is included, A, B, C, A and B, A and C, B and C, or A, B, and C may be included. Likewise, an understanding of a description such as "at least one type" is similar. The term "and/or" describes an association relationship between associated objects and indicates that three relationships may exist. For example, A and/or B may indicate the following three cases: Only A exists, both A and B exist, and only B exists. In addition, the character "/" usually indicates an "or" relationship between associated objects unless otherwise specified.

Unless otherwise stated, ordinal numbers such as "first" and "second" in the embodiments of the present disclosure are used to distinguish between a plurality of objects, but are not intended to limit a sequence, a time sequence, priorities, or importance of the plurality of objects. In addition, descriptions of "first" and "second" do not impose a limitation that objects are necessarily different.

Figure 2:
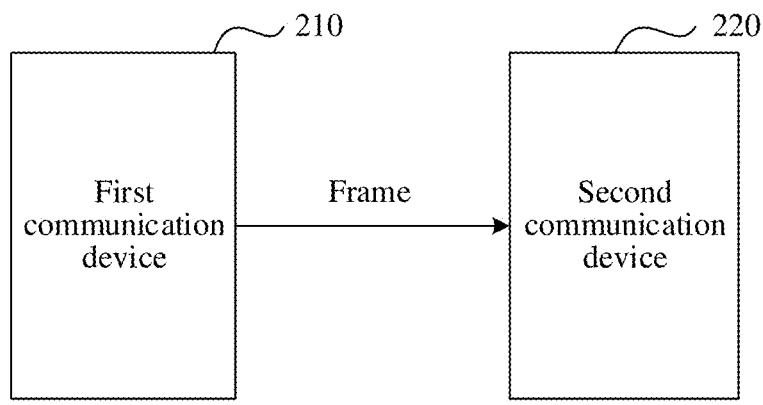
FIG. 2 is a schematic diagram of information exchange according to an embodiment of the present disclosure.

An embodiment of the present disclosure provides a Wi-Fi communication method. The method may be applied to the communication system shown in FIG. 1, and may be implemented by the network device in the communication system, or may be implemented by the terminal device in the communication system. It may be understood that, in the communication system, the network device and the terminal device each may be a device supporting a plurality of wireless communication protocols. The plurality of wireless communication protocols each may correspondingly agree on a frame format of a physical frame transmitted between the two devices. As shown in FIG. 2, as a transmit end, a first communication device 210 may generate and send a first physical frame based on the frame format. As detailed in a example flowchart shown in FIG. 10, in step 101, the first communication device 210 generates a physical frame, and then, in step 102, the first communication device 210 sends the physical frame to a second communication device 220. Correspondingly, as a receive end, the second communication device 220 may receive the first physical frame from the first communication device, and parse the first physical frame and perform subsequent processing, for example, channel estimation or frequency offset/phase tracking. As detailed in an example flowchart shown in FIG. 11, in step 111, the second communication device 220 receives the physical frame, and then, in step 112, the second communication device 220 performs channel estimation or frequency offset/phase tracking.

Figure 3:
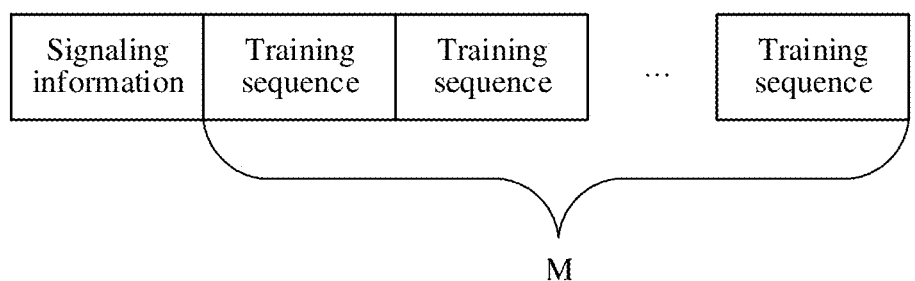
FIG. 3 is a schematic diagram of a frame format according to an embodiment of the present disclosure.

To perform channel estimation noise reduction, an embodiment of the present disclosure provides a frame format. As shown in FIG. 3, the frame format may include signaling information and a plurality of training sequences used for channel estimation. The signaling information may be used to indicate a quantity of space-time streams and a quantity of the plurality of training sequences. The quantity of the plurality of training sequences is greater than the quantity of space-time streams, that is, N>M, where N is the quantity of space-time streams, and M is the quantity of the plurality of training sequences.

The first communication device may generate a corresponding first physical frame based on the frame format shown in FIG. 3, and send the first physical frame. Correspondingly, the second communication device may receive the first physical frame and perform subsequent processing. The quantity of training sequences used for channel estimation is greater than the quantity of space-time streams, so that the second communication device can obtain more training sequences after receiving the first physical frame. In this way, accuracy of a related algorithm can be improved when the second communication device performs processing such as channel estimation or frequency offset/phase tracking based on the plurality of obtained training sequences, thereby helping improve a demodulation capability of the second communication device, and ensure a data demodulation effect.

It may be understood that, when the communication device supports a plurality of wireless communication protocols or a plurality of service scenarios, for example, the first communication device may first determine a frame format of a to-be-generated first physical frame, and then generate the first physical frame based on the determined frame format. The first communication device may determine the frame format of the to-be-generated first physical frame based on an application scenario, a service requirement, or the like. For example, the first communication device may determine the frame format of the to-be-generated first physical frame based on a modulation scheme of transmitted data or related indication information obtained from a software layer. This is not limited in the present disclosure.

The modulation scheme is used as an example. For example, when a wireless communication system uses higher order modulation (for example, a used modulation scheme is higher than or equal to 4K quadrature amplitude modulation (QAM)), the frame format shown in FIG. 3 may be used; and/or when a physical frame used for a TxBF technology needs to be generated, the frame format shown in FIG. 3 may be used. In some other cases in which a demodulation requirement is relatively low (for example, when lower order modulation such as 64 QAM, 256 QAM, or 1024 QAM is used or non-TxBF is used), another frame format may be used. This is not limited in the present disclosure.

It may be understood that the frame format shown in FIG. 3 is merely an example for describing content included in the frame format in this embodiment, and constitutes no limitation on content, a field length, or the like of the frame format. During actual application, the frame format shown in FIG. 3 may be a part of a frame format of a radio frame, a data frame, or the like transmitted by using a physical link between different communication devices. A frame generated by the first communication device may include but is not limited to content shown in FIG. 3. This is not limited in the present disclosure.

In addition, because the frame format shown in FIG. 3 is proposed for channel estimation noise reduction, the frame format of the first physical frame may be obtained by improving, for example, a frame format of a second physical frame specified in a Wi-Fi communication protocol. For example, the foregoing signaling information may be added to a reserved field in the frame format of the second physical frame, and more training sequences may be added to a training sequence field in the frame format of the second physical frame, to obtain the frame format of the first physical frame.

Figure 4:
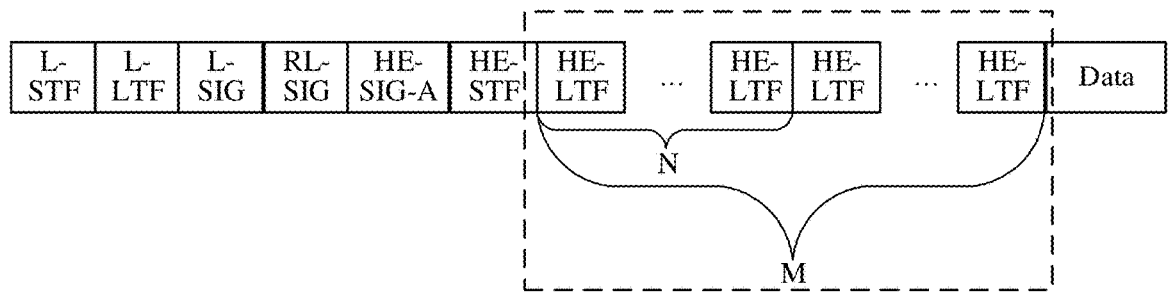
FIG. 4 is a schematic diagram of a frame format of a PPDU packet according to an embodiment of the present disclosure.

A single-user MIMO system is used as an example. The first physical frame and the second physical frame may be presentation protocol data unit (PPDU) packets. As shown in FIG. 4, the frame format of the first physical frame and the frame format of the second physical frame each may include the following parts: (1) a short training field (L-STF) and a long training field (long training field, L-LTF) that are used for automatic gain control (AGC) and synchronization; and L-SIG and HE-SIG-A that are used for signaling exchange and frame format determining; (2) HE-STF used for second-time AGC of a user; (3) training sequences HE-LTF used for channel estimation; and (4) data that needs to be transmitted. Compared with the frame format of the second physical frame, the signaling information shown in FIG. 3 may be located in the HE-SIG-A part, for example, a reserved B14 bit in HE-SIGA, and the plurality of training sequences shown in FIG. 3 may be the HE-LTF part shown in a dashed-line box in FIG. 4. N−M training sequences that are additionally set in the format of the first physical frame compared with the frame format of the second physical frame are added for channel estimation noise reduction in this embodiment, are set after an $N^{th}$ training sequence.

After receiving signals on a plurality of antennas, the second communication device demodulates the signaling information from HE-SIG-A and obtains the quantity of space-time streams and the quantity of training sequences, and then the second communication device can determine a corresponding precoding matrix based on preset frame format configuration information and the quantity of space-time streams and the quantity of the plurality of training sequences that are included in the signaling information. Then, after processing the plurality of training sequences based on the precoding matrix, the second communication device extracts a signal on each subcarrier and performs channel estimation on the subcarrier by using a plurality of training sequences obtained after processing, to obtain a channel response H. Therefore, the second communication device can improve precision of an algorithm such as channel estimation or frequency offset/phase tracking based on the obtained information, thereby improving a demodulation capability.

Figure 5:
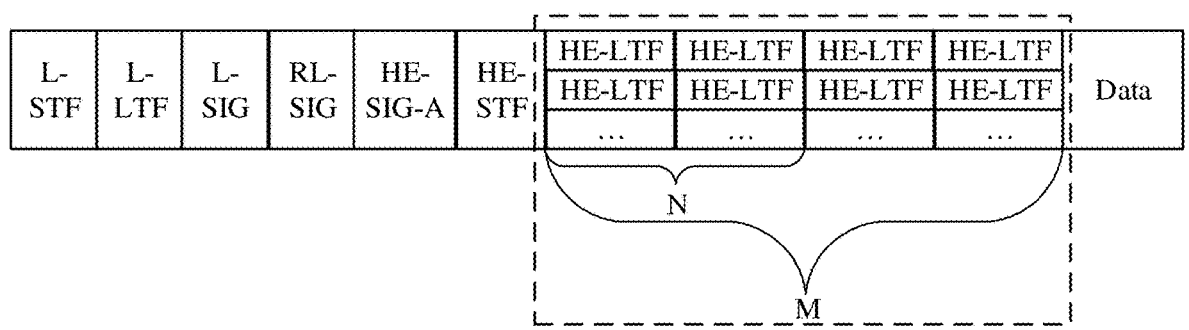
FIG. 5 is a schematic diagram of a frame format according to an embodiment of the present disclosure.
Figure 6:
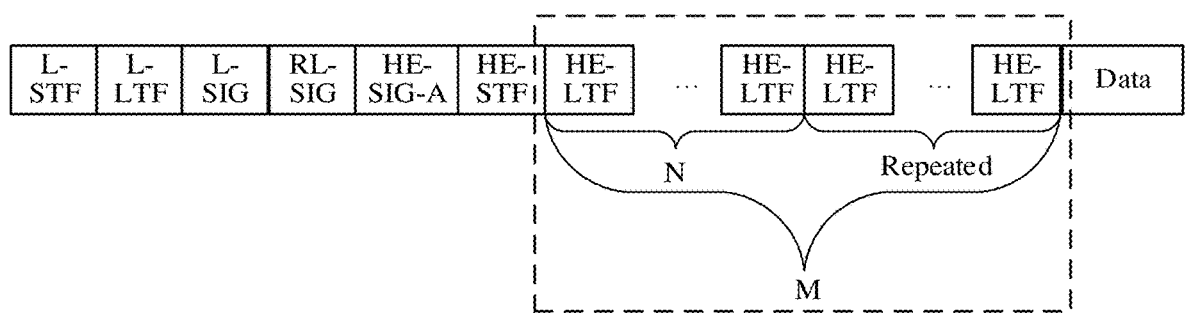
FIG. 6 is a schematic diagram of a frame format according to an embodiment of the present disclosure.

It should be noted that, as shown in FIG. 4, in the first physical frame generated based on the frame format of the present disclosure, first N channel estimation training sequences may be training sequences specified in the Wi-Fi communication protocol, and an $(M+1)^{th}$ to an $N^{th}$ training sequences are training sequences added to improve channel estimation noise reduction in this embodiment. For ease of distinguishing, the M training sequences may also be referred to as non-enhanced training sequences, and the N training sequences are referred to as enhanced training sequences. Correspondingly, the second physical frame that includes the non-enhanced training sequences may be referred to as a non-enhanced physical frame, and the first physical frame that includes the enhanced training sequences may be referred to as an enhanced physical frame. These are not distinguished one by one below. It may be understood that, in this embodiment, arrangement of the plurality of training sequences in the generated physical frame is not limited to a sequential arrangement manner shown in FIG. 4, and is explained and described below with reference to FIG. 5 and FIG. 6. Details are not described herein.

In this embodiment, to obtain the first physical frame that is based on the frame format shown in FIG. 3, when generating the first physical frame, the first communication device may precode, based on the precoding matrix, time domain symbols (for example, OFDM symbols) corresponding to the space-time streams, to obtain processed time domain symbols, namely, the plurality of training sequences. The precoding matrix is an M×N matrix, M is the quantity of space-time streams, N is the quantity of the plurality of training sequences, and M and N are positive integers.

With reference to embodiments, the following describes the precoding matrix used when the first physical frame is generated in this embodiment.

In this embodiment, the precoding matrix used when the first physical frame is generated may have the following characteristics: Row vectors in the precoding matrix are orthogonal; and/or elements in an $(M+1)^{th}$ column to an $N^{th}$ column are the same as elements in the first column to a $j^{th}$ column in the precoding matrix, and the row vectors in the precoding matrix are orthogonal, where j is equal to N−M. Therefore, when the quantity of space-time streams and the time domain symbols corresponding to the space-time streams are known, the time domain symbols corresponding to the space-time streams may be processed based on the precoding matrix, to obtain a plurality of training sequences of a required quantity. In addition, because the quantity of training sequences is increased by using the precoding matrix, accuracy of a related algorithm can be improved when the second communication device serving as a receive end can perform processing such as channel estimation or frequency offset/phase tracking based on more training sequences, thereby helping improve a demodulation capability of the second communication device, and ensure a data demodulation effect.

In an example, the first communication device may obtain a related indication about the quantity of space-time streams from a software layer, and then determine, as the quantity of the plurality of training sequences in the to-be-generated first physical frame, any proper value greater than the quantity of space-time streams, to determine the to-be-used precoding matrix based on the quantity of space-time streams and the quantity of the plurality of training sequences.

In another example, for the frame format described in this embodiment, a correspondence between the quantity of space-time streams and the quantity of training sequences may be preconfigured. After determining the quantity of space-time streams, the first communication device can determine, based on the correspondence, the quantity of training sequences that corresponds to the quantity of space-time streams, to determine, based on the quantity of space-time streams and the quantity of training sequences, the precoding matrix that needs to be used when the first physical frame is generated. The correspondence may be configured based on an application scenario, a service requirement, or the like. The correspondence is not limited in the present disclosure.

In an implementation, in the correspondence, the quantity of training sequences may be configured as an integer multiple of the quantity of space-time streams. For example, the correspondence between the quantity of space-time streams and the quantity of training sequences may be shown in the following Table 1:

TABLE 1

| $N_{STS}$ | $N_{HE-LTF}$ |
|---|---|
| 1 | 4 |
| 2 | 4 |
| 3 | 8 |
| 4 | 8 |

$N_{STS}$ represents the quantity of space-time streams, and $N_{HE-LTF}$ represents the quantity of training sequences.

It may be understood that Table 1 is merely an example for describing a case in which the quantity of training sequences is greater than the quantity of space-time streams, and constitutes no limitation. In some embodiments, when the quantity of training sequences is greater than the quantity of space-time streams, the quantity of training sequences may be alternatively a non-integer multiple (for example, 1.5 times) of the quantity of space-time streams. This is not limited in the present disclosure.

Figure 10:
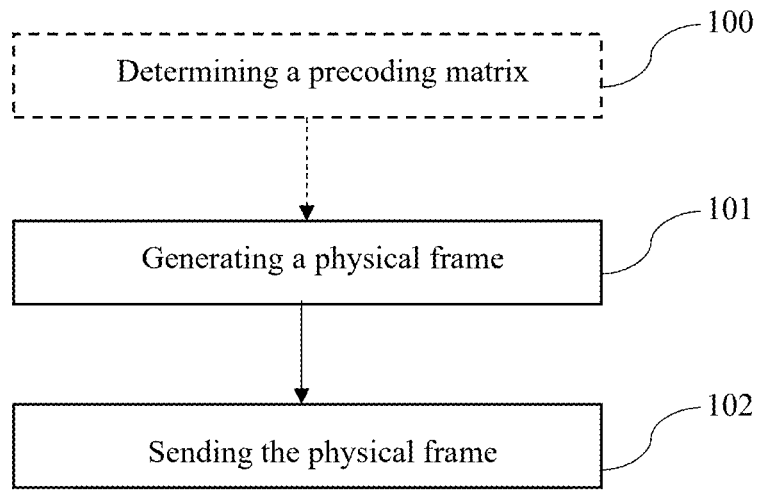
FIG. 10 is an example flowchart for a communication method according to an embodiment of the present disclosure.

After determining the quantity of space-time streams and the quantity of training sequences, as shown in step 100 of FIG. 10, the first communication device may determine the corresponding precoding matrix based on the quantity of space-time streams and the quantity of training sequences. The precoding matrix may be used to: when generating the first physical frame, process the OFDM symbols of the space-time streams to obtain processed OFDM symbols, namely, the plurality of training sequences, to generate the first physical frame.

In an example, the precoding matrix may be a matrix including elements in first M rows and first N columns in a preset reference matrix; or the precoding matrix may be obtained by reconstructing elements in the first M rows and first j columns in the reference matrix, and j is equal to N−M, where the reference matrix is obtained by concatenating at least two specified matrices P, and the matrix P is a predefined matrix used to precode the time domain symbols corresponding to the space-time streams.

It may be understood that in this embodiment, a communication device developer may configure, based on the frame format of the first physical frame, the reference matrix that needs to be used, so that the first communication device can obtain, based on the reference matrix in a scenario in which the first physical frame needs to be generated, the precoding matrix that needs to be used to generate the first physical frame.

With reference to embodiments, the following describes the reference matrix that may be used in this embodiment.

In an example, the matrix P may be a 4-row and 4-column matrix that is of a data carrier and a pilot and that is specified in a Wi-Fi communication protocol (for example, an IEEE 802.11ax protocol), and elements in the matrix P are shown as follows:

$$P_{4\times4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

In this embodiment, the reference matrix may be obtained based on the matrix P, the precoding matrix may be obtained based on the reference matrix, and the precoding matrix may include $P_{HE-LTF}$ and $P_{pilot}$ that are required for generating the first physical frame.

It can be learned based on the correspondence shown in Table 1 that, in a case of a same quantity of space-time streams, the quantity of training sequences in the corresponding first physical frame in the frame format shown in FIG. 3 may be an even multiple, for example, two times, four times, or even more times, of the quantity of space-time streams.

First Implementation

In the first implementation, for example, frame format configuration information may be preconfigured as follows: When $N_{HE-LTF}=4$ or 8, the required precoding matrix is obtained based on the following reference matrix $P_{4\times8}$.

$$P_{4\times8} = [P_{4\times4} P_{4\times4}] = \begin{bmatrix} 1 & -1 & 1 & 1 & 1 & -1 & 1 & 1 \\ 1 & 1 & -1 & 1 & 1 & 1 & -1 & 1 \\ 1 & 1 & 1 & -1 & 1 & 1 & 1 & -1 \\ -1 & 1 & 1 & 1 & -1 & 1 & 1 & 1 \end{bmatrix}.$$

During application, for example, the first communication device may determine, based on the correspondence shown in Table 1, the quantity of training sequences that corresponds to the quantity of space-time streams, to obtain, based on the quantity of space-time streams, the quantity of training sequences, and the reference matrix in the frame format configuration information, the precoding matrix that needs to be used to generate the first physical frame.

Specifically, for example, when $N_{STS}=1$, and $N_{HE-LTF}=4$: $P_{1\times4}=[1\ -1\ 1\ 1]$; and $P_{pilot}=[1\ -1\ 1\ 1]$.

For example, when $N_{STS}=2$, and $N_{HE-LTF}=4$:

$$P_{2\times4} = \begin{bmatrix} 1 & -1 & 1 & 1 \\ 1 & 1 & -1 & 1 \end{bmatrix}; \text{ and } P_{pilot} = [1\ -1\ 1\ 1].$$

When $N_{STS}=3$ or 4, and $N_{HE-LTF}=8$:
$P_{8\times8}=[P_{4\times4}\ P_{4\times4}]$; and $P_{pilot}=[1\ -1\ 1\ 1\ 1\ -1\ 1\ 1]$.

The single-user MIMO system is still used as an example. When $N_{STS}=3$ or 4, and $N_{HE-LTF}=8$, the plurality of training sequences obtained after the OFDM symbols of the space-time streams are processed based on the precoding matrix may be shown in a dashed-line box in FIG. 5.

Correspondingly, after receiving the first physical frame, the second communication device may obtain the quantity of space-time streams and the quantity of the plurality of training sequences based on the signaling information through parsing, to determine the precoding matrix based on the preset frame format configuration information, the quantity of space-time streams, and the quantity of the plurality of training sequences. Then, the second communication device may process the plurality of received training sequences based on the obtained precoding matrix, and perform channel estimation, frequency offset/phase tracking, or the like by using the plurality of training sequences obtained after processing.

The second communication device may perform channel estimation based on the plurality of training sequences obtained after processing and the following formula:

$$HEChest_{Ltf}^{(irx,ists)}(k) = \frac{\sum_{n=1}^{Nheltf} Y_{hltf}^{irx}(n,k) \times P[ists][n-1]}{Nheltf} \times Known_{hltf}(k).$$

Nheltf represents a quantity of training sequences, n represents an nth training sequence, Y represents the training sequences, and P represents the precoding matrix, including PHE-LTF and $P_{pilot}$.

Herein, because the second communication device can obtain more training sequences, when channel estimation is performed based on the foregoing formula, accuracy of a channel estimation algorithm can be improved, thereby helping improve a demodulation capability of the second communication device serving as a receive end.

Alternatively, the second communication device may calculate a phase by using the plurality of training sequences obtained after processing and the following formulas:

$$\text{Phase } I, Q = \sum_{i=0}^{Nrx-1} \sum_{k=0}^{subcarriers-1} \left(Y_{hltf}^{i,1}(k)\right)^* \cdot \left(Y_{hltf}^{i,3}(k)\right)$$

Phase = angle (phase $I, Q$)

$\Delta f = \text{Phase}/(2\Pi \cdot \Delta t)$, where $\Delta t$ is a time difference between two conjugate multiplication symbols.

Y represents the training sequences.

In the phase calculation formulas, only the first training sequence and the third training sequence are used for conjugate multiplication. When four training sequences are required, because in the used pre-coding matrix $P_{pilot}$, an element corresponding to the first training sequence is the same as an element corresponding to the fourth training sequence, and an element corresponding to the second training sequence and an element corresponding to the third training sequence differ in a negative sign, a plurality of training sequences obtained based on this relationship can improve accuracy of channel estimation or frequency deviation/phase tracking.

Second Implementation

In the second implementation, for example, frame format configuration information may be preconfigured as follows: Based on a difference between the quantity of space-time streams and a quantity of required training sequences, for an excess part relative to the quantity of space-time streams, training sequences are repeatedly sent to obtain a plurality of training sequences whose quantity is greater than the quantity of space-time streams.

Herein, to obtain the repeatedly sent training sequences, the precoding matrix that needs to be used to generate the first physical frame may be obtained by reconstructing elements in first M rows and first j columns in a reference matrix, and j is equal to N−M.

For example, the reference matrix used in the second implementation may be the same as that used in the first implementation, and is the foregoing matrix $P_{4\times 8}$. For example, $N_{STS}=2$, and $N_{HE-LIF}=4$. When the precoding matrix is obtained through reconstruction based on the reference matrix, after the elements in the first M (M=$N_{STS}$=2) rows and the first j (j=$N_{HE-LTF}$−$N_{STS}$=2) columns are obtained from the reference matrix, the obtained elements in the first M rows and the first j columns in the reference matrix may be used as elements in first M rows and first j columns in the required precoding matrix, and the obtained elements in the first M rows and the first j columns in the reference matrix may be used as elements in an (M+1)$^{th}$ column to an N$^{th}$ column in the precoding matrix.

It may be understood that, herein, this is merely an example for description and constitutes no limitation. During actual application, $N_{HE-LTF}$ and $N_{STS}$ are not in a fixed relationship. Therefore, during actual application, when the required precoding matrix is obtained through reconstruction based on the reference matrix, reconstruction may be flexibly performed based on the frame format configuration information and related information used during actual application, to obtain the required precoding matrix.

For example, based on the foregoing matrix $P_{4\times 8}$ and the correspondence shown in Table 1, in the second implementation, for example, the precoding matrix that needs to be used may be shown as follows:

(1) When $N_{STS}=1$, and $N_{HE-LTF}=4$:
$P_{1\times 4}=[1\ -1\ 1\ -1]$; and $P_{pilot}=[1\ -1\ 1\ -1]$.
(2) When $N_{STS}=2$, and $N_{HE-LTF}=4$:

$$P_{2\times 4} = \begin{bmatrix} 1 & -1 & 1 & -1 \\ 1 & 1 & 1 & 1 \end{bmatrix}; \text{ and } P_{pilot} = [\,1\ -1\ 1\ -1\,].$$

(3) When $N_{STS}=3$ or 4, and $N_{HE-LTF}=8$:
$P_{8\times 8}=[P_{4\times 4}\ P_{4\times 4}]$; and $P_{pilot}=[1\ -1\ 1\ 1\ 1\ -1\ 1\ 1]$.

Further, during actual application, when the quantity of space-time streams is determined, the first communication device may determine the quantity of required training sequences based on, for example, Table 1; and when both the quantity of space-time streams and the quantity of training sequences are known, obtain, based on the frame format configuration information, the precoding matrix required for generating the first physical frame.

It may be understood that, in another case, if $N_{HE-LTF}$ is a non-integer multiple of $N_{STS}$ or $N_{HE-LTF}$ is far greater than $N_{STS}$ (for example, $N_{HE-LTF}$ is three or even more times of $N_{STS}$), when the precoding matrix is obtained through reconstruction based on the elements in the reference matrix, for the excess part of the plurality of required training sequences relative to the quantity of space-time streams, corresponding elements may be obtained from the reference matrix based on a multiple relationship between $N_{HE-LTF}$ and $N_{STS}$ as a part that is in the required precoding matrix and that corresponds to N−M added training sequences, to obtain, through reconstruction, the precoding matrix required for generating the first physical frame.

The single-user MIMO system is still used as an example. When $N_{STS}=1$, and $N_{HE-LTF}=4$, the plurality of training sequences obtained after the OFDM symbols of the space-time streams are processed based on the precoding matrix may be shown in a dashed-line box in FIG. 6.

Figure 11:
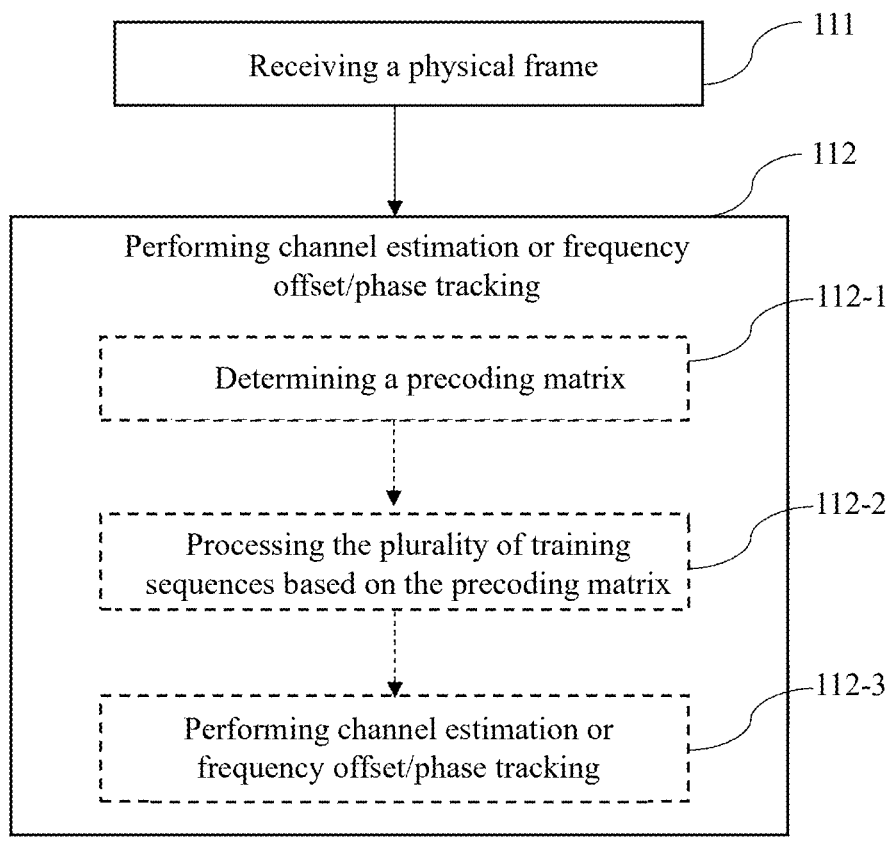
FIG. 11 is an example flowchart for a communication method according to an embodiment of the present disclosure.

Correspondingly, as shown in the flowchart of FIG. 11, in step 112-1, after receiving the first physical frame, the second communication device may obtain the quantity of space-time streams and the quantity of the plurality of training sequences based on the signaling information, to determine the precoding matrix based on the preset frame format configuration information, the quantity of space-time streams, and the quantity of the plurality of training sequences. Then, the second communication device may process the plurality of received training sequences based on the precoding matrix in step 112-2, and perform channel estimation or frequency offset/phase tracking by using the plurality of training sequences obtained after processing in step 112-3. Thus, the performing of channel estimation or frequency offset/phase tracking by the second communication device 220 in step 112 comprises operations performed in step 112-1, step 112-2 and step 112-3.

The second communication device may perform channel estimation based on the plurality of training sequences obtained after processing and the following formula:

$$HEChest_{Ltf}^{(irx,ists)}(k) = \frac{\sum_{n=1}^{Nheltf} Y_{hltf}^{irx}(n, k) \times P[ists][n-1]}{Nheltf} \times Known_{hltf}(k).$$

Nheltf represents a quantity of training sequences, n represents an $n^{th}$ training sequence, Y represents the training sequences, and P represents the precoding matrix, including $P_{HE\text{-}LTF}$ and $P_{pilot}$.

Herein, because the second communication device can obtain more training sequences, when channel estimation is performed based on the foregoing formula, accuracy of a channel estimation algorithm can be improved, thereby helping improve a demodulation capability of the second communication device serving as a receive end.

Alternatively, the second communication device may calculate a phase by using the plurality of training sequences obtained after processing and the following formulas:

$$\text{Phase } I, Q = \sum_{i=0}^{Nrx-1} \sum_{n=0}^{Nheltf} \sum_{k=0}^{subcarriers-1} \left(Y_{hltf}^{i,n}(k)\right)^* \cdot \left(Y_{hltf}^{i,n+Nheltf}(k)\right)$$

Phase = angle (phase $I$, $Q$)

$\Delta f = \text{Phase}/(2\Pi \cdot \Delta t)$, where $\Delta t$ is a time difference between two conjugate multiplication symbols.

Y represents the training sequences.

In the phase calculation formulas, in the plurality of training sequences, repeatedly sent training sequences are completely consistent with previously non-repeatedly-sent training sequences. Therefore, the second communication device may calculate frequency offsets/phases for all subcarriers by using the following two symbols, to align phases of the training sequences, and feed back a time domain cfo/sco for frequency offset calibration:

$Y_{hltf}^{i,n}$ and $Y_{hltf}^{i,n+Nheltf}$.

Compared with the matrix P specified in the protocol in the first implementation, in the second implementation, when there are four training sequences, because first two sent training sequence symbols are correspondingly consistent with last two training sequence symbols after sending, a high-accuracy phase may be calculated on the OFDM symbols through accumulation, or a phase may be calculated with an advance of one OFDM symbol, to reduce a delay.

Therefore, in this embodiment, the first communication device may determine, in the foregoing two implementations based on the quantity of space-time streams and the frame format of the to-be-generated first physical frame, the precoding matrix that needs to be used when the first physical frame is generated, and process the time domain symbols of the space-time streams based on the obtained precoding matrix, to obtain the plurality of training sequences. After receiving the first physical frame, the second communication device may obtain the quantity of space-time streams and the quantity of training sequences from the signaling information through parsing, to determine the precoding matrix based on the preset frame format configuration information, the quantity of space-time streams, and the quantity of the plurality of training sequences. Then, the second communication device may process the plurality of received training sequences based on the obtained precoding matrix, and perform channel estimation, frequency offset/phase tracking, or the like by using the plurality of training sequences obtained after the processing, to improve accuracy of a corresponding algorithm, thereby helping improve a demodulation capability of the second communication device.

It may be understood that the foregoing two implementations are merely examples for describing the matrix P that can be used in the present disclosure, the reference matrix obtained after concatenation based on the matrix P, and the obtained precoding matrix, and constitute no limitation. In other embodiments, the used matrix P and/or values or positive/negative signs of the elements in the matrix P and a concatenation manner may be adaptively changed based on an application scenario or a service requirement. This is not limited in the present disclosure. In addition, during actual application, the frame format and/or the frame format configuration information may be further flexibly adjusted based on an algorithm requirement. This is not limited in the present disclosure. For example, when the quantity $N=N_{HE\text{-}LTF}$ of training sequences is a value ranging from 8 to 16, the used reference matrix may be shown as follows:

$$P_{8\times16} = \begin{bmatrix} P_{4\times4} & P_{4\times4} & P_{4\times4} & P_{4\times4} \\ P_{4\times4} & P_{4\times4} & P_{4\times4} & P_{4\times4} \end{bmatrix}; \text{ or}$$

$$P_{16\times16} = \begin{bmatrix} P_{4\times4} & P_{4\times4} & P_{4\times4} & P_{4\times4} \\ P_{4\times4} & P_{4\times4} & P_{4\times4} & P_{4\times4} \\ P_{4\times4} & P_{4\times4} & P_{4\times4} & P_{4\times4} \\ P_{4\times4} & P_{4\times4} & P_{4\times4} & P_{4\times4} \end{bmatrix}.$$

In addition, to perform channel estimation noise reduction, the design of the present disclosure may be adaptively changed in another manner, to ensure a demodulation capability of a receive end communication device as much as possible.

For example, the present disclosure further provides a design, that is, transmit power of some of the plurality of training sequences may be increased when the first physical frame is generated. For example, the transmit power of some of the plurality of training sequences may be doubled, in other words, the transmit power of some of the plurality of training sequences is twice original transmit power. Therefore, the power of some of the training sequences is increased to improve accuracy of an algorithm, such as channel estimation or frequency offset/phase tracking, performed by the second communication device, thereby helping improve a demodulation capability of the second communication device.

It may be understood that in this embodiment, even if the frame format shown in FIG. 3 is not used, to improve accuracy of a related algorithm of the second communication device to implement channel estimation noise reduction, alternatively, power of some of carried training sequences may be increased in any related physical frame, so that transmit power of at least one of the plurality of training sequences is greater than transmit power of an original training sequence of the training sequence. This is not limited in the present disclosure. In some embodiments, for a plurality of training sequences in a same frame, transmit power of a part of training sequences may be increased to be higher than transmit power of the other part in the physical frame, and the transmit power of the other part of training sequences remains unchanged. This is not limited in the present disclosure.

Figure 7:
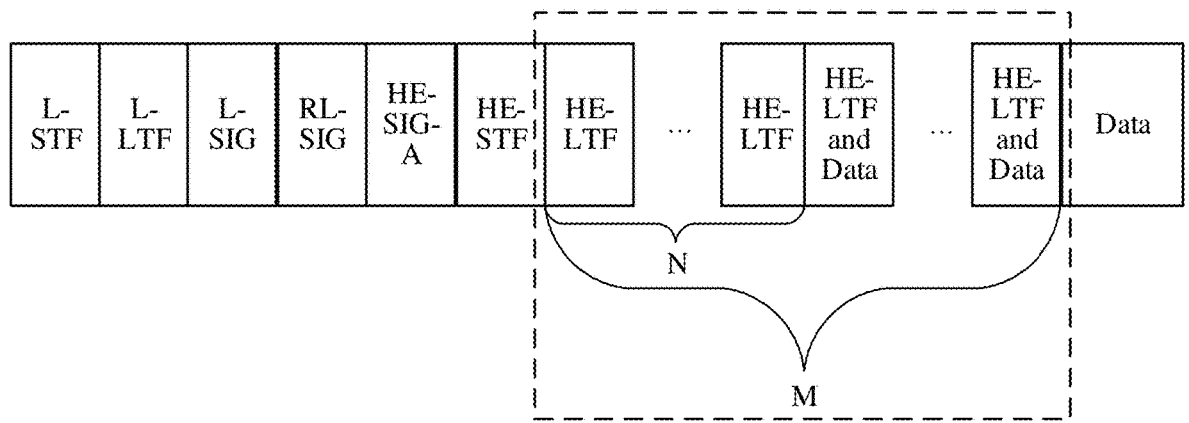
FIG. 7 is a schematic diagram of a frame format according to an embodiment of the present disclosure.

In addition, in a wireless communication protocol, a length of an agreed physical frame is fixed. Referring to FIG. 4, when the frame format shown in FIG. 3 is a part of a data frame, if a quantity of training sequences is increased in the generated data frame, a data part behind the training sequences may be occupied. Therefore, when the first physical frame is generated based on the frame format shown in FIG. 3 or FIG. 4, to reduce impact on content of a part that is in the first physical frame and that is located behind the training sequence part, a training sequence part (for example, an excess training sequence relative to the quantity of space-time streams) added due to the design of the present disclosure may be a non-full-bandwidth channel, and a transmission resource that carries at least one of the plurality of training sequences may further carry data that needs to be transmitted. As shown in FIG. 7, a frequency domain subcarrier of an OFDM symbol corresponding to the training sequence part may partially include a training sequence and partially include data (for example, data with a relatively low modulation and coding rate).

Therefore, according to the foregoing design of the present disclosure, in a scenario (for example, TxBF) in which channel estimation needs to be performed, based on the frame format shown in FIG. 4, in the first physical frame that can carry the training sequences used for channel estimation, the first communication device serving as a transmit end may enable the quantity of carried training sequences to be greater than the quantity of space-time streams, or enable the transmit power of the at least one carried training sequence part to be greater than the transmit power of the original training sequence of the training sequence part, and indicate the quantity of space-time streams and the quantity of training sequences based on the signaling information in the first physical frame. Then, when the second communication device serving as a receive end receives the first physical frame and performs a related algorithm such as channel estimation, because more training sequences or higher power can be obtained, accuracy of the related algorithm can be improved, thereby helping improve a demodulation capability of the second communication device, and ensure a data demodulation effect.

Figure 8:
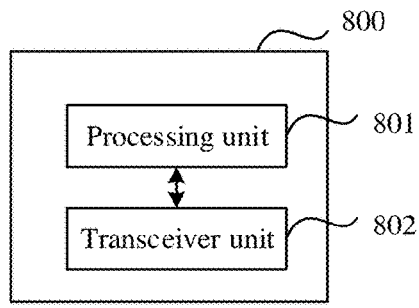
FIG. 8 is a schematic diagram of a communication apparatus according to an embodiment of the present disclosure.

Based on a same technical concept, an embodiment of the present disclosure further provides a Wi-Fi communication apparatus. A structure of an apparatus 800 is shown in FIG. 8, and includes a processing unit 801 and a transceiver unit 802. The communication apparatus 800 may be applied to the network device or the terminal device in the communication system shown in FIG. 1, and can implement the foregoing embodiments and the Wi-Fi communication method provided in the embodiments. The following describes functions of the units in the apparatus 800.

In an example, when the Wi-Fi communication apparatus is the first communication device in the foregoing embodiments, the processing unit 801 is configured to generate a first physical frame, where the first physical frame includes signaling information and a plurality of training sequences used for channel estimation, the signaling information indicates a quantity of space-time streams and a quantity of the plurality of training sequences, and the quantity of the plurality of training sequences is greater than the quantity of space-time streams; and the transceiver unit 802 is configured to send the first physical frame to a second communication device.

In a possible design, the quantity of the plurality of training sequences is an integer multiple of the quantity of space-time streams.

In a possible design, the plurality of training sequences are obtained by precoding, based on a precoding matrix, time domain symbols corresponding to the space-time streams, where the precoding matrix is an M×N matrix, M is the quantity of space-time streams, N is the quantity of the plurality of training sequences, and M and N are positive integers.

In a possible design, row vectors in the precoding matrix are orthogonal; and/or elements in an $(N+1)^{th}$ column to an $M^{th}$ column are the same as elements in the first column to a $j^{th}$ column in the precoding matrix, and the row vectors in the precoding matrix are orthogonal, where j is equal to N−M.

In a possible design, the precoding matrix is a matrix including elements in first M rows and first N columns in a preset reference matrix; or the precoding matrix is obtained by reconstructing elements in the first M rows and first j columns in the reference matrix, and j is equal to N−M, where the reference matrix is obtained by concatenating at least two specified matrices P, and the matrix P is a predefined matrix used to precode the time domain symbols corresponding to the space-time streams.

In a possible design, the matrix P is a 4-row and 4-column matrix specified in a Wi-Fi communication protocol, and elements in the matrix P are shown as follows:

$$P_{4 \times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

In a possible design, before generating the first physical frame, the processing unit is further configured to determine the precoding matrix based on the quantity of space-time streams, the quantity of the plurality of training sequences, and preset frame format configuration information.

In a possible design, when the transceiver unit sends the first physical frame to the second communication device, transmit power of at least one of the plurality of training sequences is greater than transmit power of an original training sequence of the training sequence.

In a possible design, a transmission resource that carries at least one of the plurality of training sequences further carries data that needs to be transmitted.

In a possible design, the first physical frame is a frame generated when a transmit beamforming (TxBF) technology is used and a used modulation scheme is higher than or equal to 4K quadrature amplitude modulation (QAM).

In a possible design, the signaling information is located in a reserved field in the first physical frame, and the plurality of training sequences are located in a training sequence field in the first physical frame.

In another example, when the Wi-Fi communication apparatus is the second communication device in the foregoing embodiments, the transceiver unit 802 is configured to receive a first physical frame from a first communication device, where the first physical frame includes signaling information and a plurality of training sequences used for channel estimation, the signaling information indicates a quantity of space-time streams and a quantity of the plurality of training sequences, and the quantity of the plurality of training sequences is greater than the quantity of space-time streams; and the processing unit 801 is configured to perform channel estimation or frequency offset/phase tracking based on the signaling information and the plurality of training sequences that are included in the first physical frame.

In a possible design, the processing unit is configured to: determine a precoding matrix based on preset frame format configuration information, and the quantity of space-time streams and the quantity of the plurality of training sequences that are included in the signaling information, where the precoding matrix is an M×N matrix, M is the quantity of space-time streams, N is the quantity of the plurality of training sequences, and M and N are positive integers; and after processing the plurality of training sequences based on the precoding matrix, perform channel estimation or frequency offset/phase tracking by using a plurality of training sequences obtained after processing.

In a possible design, the quantity of the plurality of training sequences is an integer multiple of the quantity of space-time streams.

In a possible design, row vectors in the precoding matrix are orthogonal; and/or elements in an $(M+1)^{th}$ column to an $N^{th}$ column are the same as elements in the first column to a $j^{th}$ column in the precoding matrix, and the row vectors in the precoding matrix are orthogonal, where j is equal to N−M.

In a possible design, the precoding matrix is a matrix including elements in first M rows and first N columns in a preset reference matrix; or the precoding matrix is obtained by reconstructing elements in the first M rows and first j columns in the reference matrix, and j is equal to N−M, where the reference matrix is obtained by concatenating at least two specified matrices P, and the matrix P is a predefined matrix used to precode time domain symbols corresponding to the space-time streams.

In a possible design, the matrix P is a 4-row and 4-column matrix specified in a Wi-Fi communication protocol, and elements in the matrix P are shown as follows:

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

In a possible design, a transmission resource that carries at least one of the plurality of training sequences further carries data that needs to be transmitted.

In a possible design, the first physical frame is a frame generated when a transmit beamforming (TxBF) technology is used and a used modulation scheme is higher than or equal to 4K quadrature amplitude modulation (QAM).

In a possible design, the signaling information is located in a reserved field in the first physical frame, and the plurality of training sequences are located in a training sequence field in the first physical frame.

It should be understood that in the apparatus, the processing unit 801 may be implemented by a processor or a processor-related circuit component, and the transceiver unit 802 may be implemented by a transceiver or a transceiver-related circuit component. Operations and/or functions of the units in the communication apparatus are separately used to implement corresponding procedures of the method shown in FIG. 2. For brevity, details are not described herein again.

Figure 9:
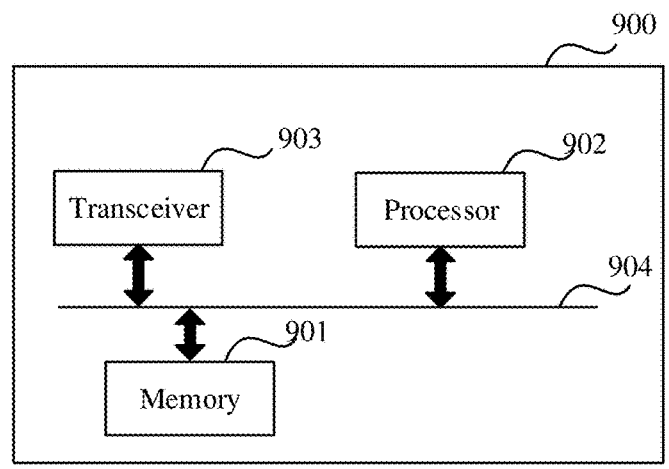
FIG. 9 is a schematic diagram of a communication device according to an embodiment of the present disclosure.

Based on a same technical concept, the present disclosure further provides a communication device. The communication device may be applied to the network device or the terminal device in the communication system shown in FIG. 1, can implement the foregoing embodiments and the method provided in the embodiments, and has the function of the communication apparatus shown in FIG. 8. Referring to FIG. 9, a communication device 900 includes a memory 901, a processor 902, and a transceiver 903. The memory 901, the processor 902, and the transceiver 903 are connected to each other.

Optionally, the memory 901, the processor 902, and the transceiver 903 are connected to each other by using a bus 904. The memory 901 is configured to store program code. The processor 902 may obtain the program code from the memory 901 and perform corresponding processing. The bus 904 may be a peripheral component interconnect (PCI) bus, an extended industry standard architecture (EISA) bus, or the like. The bus may be classified as an address bus, a data bus, a control bus, or the like. For ease of representation, only one bold line is used to represent the bus in FIG. 9, but this does not mean that there is only one bus or only one type of bus.

In an example, when the communication device 900 is implemented as the foregoing first communication device, the processor 902 is configured to generate a first physical frame, where the first physical frame includes signaling information and a plurality of training sequences used for channel estimation, the signaling information indicates a quantity of space-time streams and a quantity of the plurality of training sequences, and the quantity of the plurality of training sequences is greater than the quantity of space-time streams; and the transceiver 903 is configured to send the first physical frame to a second communication device.

In a possible design, the quantity of the plurality of training sequences is an integer multiple of the quantity of space-time streams.

In a possible design, the plurality of training sequences are obtained by precoding, based on a precoding matrix, time domain symbols corresponding to the space-time streams, where the precoding matrix is an M×N matrix, M is the quantity of space-time streams, N is the quantity of the plurality of training sequences, and M and N are positive integers.

In a possible design, row vectors in the precoding matrix are orthogonal; and/or elements in an $(N+1)^{th}$ column to an $M^{th}$ column are the same as elements in the first column to a $j^{th}$ column in the precoding matrix, and the row vectors in the precoding matrix are orthogonal, where j is equal to N–M.

In a possible design, the precoding matrix is a matrix including elements in first M rows and first N columns in a preset reference matrix; or the precoding matrix is obtained by reconstructing elements in the first M rows and first j columns in the reference matrix, and j is equal to N–M, where the reference matrix is obtained by concatenating at least two specified matrices P, and the matrix P is a pre-defined matrix used to precode the time domain symbols corresponding to the space-time streams.

In a possible design, the matrix P is a 4-row and 4-column matrix specified in a Wi-Fi communication protocol, and elements in the matrix P are shown as follows:

$$P_{4\times4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

In a possible design, before generating the first physical frame, the processor is further configured to determine the precoding matrix based on the quantity of space-time streams, the quantity of the plurality of training sequences, and preset frame format configuration information.

In a possible design, when the transceiver sends the first physical frame to the second communication device, transmit power of at least one of the plurality of training sequences is greater than transmit power of an original training sequence of the training sequence.

In a possible design, a transmission resource that carries at least one of the plurality of training sequences further carries data that needs to be transmitted.

In a possible design, the first physical frame is a frame generated when a transmit beamforming (TxBF) technology is used and a used modulation scheme is higher than or equal to 4K quadrature amplitude modulation (QAM).

In an example, when the communication device 900 is implemented as the foregoing second communication device, the transceiver 903 is configured to receive a first physical frame from a first communication device, where the first physical frame includes signaling information and a plurality of training sequences used for channel estimation, the signaling information indicates a quantity of space-time streams and a quantity of the plurality of training sequences, and the quantity of the plurality of training sequences is greater than the quantity of space-time streams; and the processor 902 is coupled to the transceiver 903, and is configured to perform channel estimation or frequency offset/phase tracking based on the signaling information and the plurality of training sequences that are included in the first physical frame.

In a possible design, the processor is configured to: determine a precoding matrix based on preset frame format configuration information, and the quantity of space-time streams and the quantity of the plurality of training sequences that are included in the signaling information, where the precoding matrix is an M×N matrix, M is the quantity of space-time streams, N is the quantity of the plurality of training sequences, and M and N are positive integers; and after processing the plurality of training sequences based on the precoding matrix, perform channel estimation or frequency offset/phase tracking by using a plurality of training sequences obtained after processing.

In a possible design, the quantity of the plurality of training sequences is an integer multiple of the quantity of space-time streams.

In a possible design, row vectors in the precoding matrix are orthogonal; and/or elements in an $(M+1)^{th}$ column to an $N^{th}$ column are the same as elements in the first column to a $j^{th}$ column in the precoding matrix, and the row vectors in the precoding matrix are orthogonal, where j is equal to N–M.

In a possible design, the precoding matrix is a matrix including elements in first M rows and first N columns in a preset reference matrix; or the precoding matrix is obtained by reconstructing elements in the first M rows and first j columns in the reference matrix, and j is equal to N–M, where the reference matrix is obtained by concatenating at least two specified matrices P, and the matrix P is a pre-defined matrix used to precode time domain symbols corresponding to the space-time streams.

In a possible design, the matrix P is a 4-row and 4-column matrix specified in a Wi-Fi communication protocol, and elements in the matrix P are shown as follows:

$$P_{4\times4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

In a possible design, a transmission resource that carries at least one of the plurality of training sequences further carries data that needs to be transmitted.

In a possible design, the first physical frame is a frame generated when a transmit beamforming (TxBF) technology is used and a used modulation scheme is higher than or equal to 4K quadrature amplitude modulation (QAM).

In a possible design, the signaling information is located in a reserved field in the first physical frame, and the plurality of training sequences are located in a training sequence field in the first physical frame.

It may be understood that the memory 901 is configured to store program instructions, data, and the like. Specifically, the program instructions may include program code. The program code includes computer operation instructions. The memory 901 may include a random access memory RAM), and may further include a nonvolatile memory, for example, at least one magnetic disk memory. The processor 902 executes the program instructions stored in the memory 901, and implements the foregoing function by using the data stored in the memory 901, to implement the Wi-Fi communication method provided in the foregoing embodiments.

It may be understood that the memory 901 in FIG. 9 in the present disclosure may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example and not limitative description, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and the method described in this specification is intended to include but is not limited to these memories or any memory of another proper type.

Based on the foregoing embodiments, an embodiment of the present disclosure further provides a computer program. When the computer program is run on a computer, the computer is enabled to perform the Wi-Fi communication method provided in the foregoing embodiments.

Based on the foregoing embodiments, an embodiment of the present disclosure further provides a computer-readable storage medium. The computer-readable storage medium stores a computer program. When the computer program is executed by a computer, the computer is enabled to perform the Wi-Fi communication method provided in the foregoing embodiments.

The storage medium may be any available medium that can be accessed by the computer. The following provides an example but does not constitute a limitation: The computer-readable medium may include a RAM, a ROM, an EEPROM, a CD-ROM or another optical disc storage, a magnetic disk storage medium or another magnetic storage device, or any other medium that can be used to carry or store expected program code in a form of instructions or a data structure and can be accessed by the computer.

Based on the foregoing embodiments, an embodiment of the present disclosure further provides a chip. The chip is configured to read a computer program stored in a memory, to implement the Wi-Fi communication method provided in the foregoing embodiments.

Based on the foregoing embodiments, an embodiment of the present disclosure provides a chip system. The chip system includes a processor, configured to support a computer apparatus in implementing functions of the communication device in the foregoing embodiments. In a possible design, the chip system further includes a memory. The memory is configured to store a program and data that are necessary for the computer apparatus. The chip system may include a chip, or may include a chip and another discrete component.

In conclusion, the embodiments of the present disclosure provide the Wi-Fi communication method and the device. In this solution, the first physical frame sent by the first communication device to the second communication device includes the signaling information and the plurality of training sequences used for channel estimation, the signaling information may be used to indicate the quantity of space-time streams and the quantity of the plurality of training sequences, and the quantity of the plurality of training sequences is greater than the quantity of space-time streams. In this way, when receiving the first physical frame, the second communication device may know the quantity of space-time streams, the quantity of the plurality of training sequences, and the plurality of training sequences, and then may obtain, based on the quantity of space-time streams and the quantity of the plurality of training sequences, the precoding matrix used to process the training sequences, and perform algorithm processing such as channel estimation or frequency offset/phase tracking based on the plurality of training sequences obtained after processing, thereby improving demodulation performance of the second communication device, and ensuring a data demodulation effect. The quantity of training sequences used for channel estimation is greater than the quantity of space-time streams, so that the second communication device receiving the first physical frame can obtain more training sequences. Therefore, accuracy of an algorithm such as channel estimation or frequency offset/phase tracking can be improved, thereby helping improve a demodulation capability of the receive device.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. In addition, the present disclosure may use a form of a computer program product that is implemented on one or more computer-usable storage media (including but not limited to a magnetic disk memory, a CD-ROM, an optical memory, and the like) that include computer-usable program code.

The present disclosure is described with reference to the flowcharts and/or the block diagrams of the method, the device (system), and the computer program product according to the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be alternatively stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may be alternatively loaded onto a computer or another programmable data processing device, so that a series of operations and steps are performed on the computer or the another programmable device to generate computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to the present disclosure without departing from the protection scope of the present disclosure. In this way, the present disclosure is also intended to cover these modifications and variations to the present disclosure provided that they fall within the scope of the claims of the present disclosure and equivalent technologies thereof.

What is claimed is:

1. A Wi-Fi communication method, comprising:
generating a physical frame by a network device in a single-user multiple-input multiple-output (MIMO) system, wherein the physical frame comprises signaling information and a plurality of training sequences for channel estimation, the signaling information indicates a quantity of space-time streams and a quantity of the plurality of training sequences, and the quantity of the plurality of training sequences is greater than the quantity of space-time streams; and
sending the physical frame to a terminal device in the single-user MIMO system, so that the terminal device processes the plurality of training sequences in the physical frame based on both the quantity of space-time streams and the quantity of the plurality of training sequences in the signaling information, and performs channel estimation or frequency offset/phase tracking by using a plurality of processed training sequences derived from the processing of the plurality of training sequences in the physical frame.

2. The Wi-Fi communication method according to claim 1, wherein the quantity of the plurality of training sequences is an integer multiple of the quantity of space-time streams.

3. The Wi-Fi communication method according to claim 1, wherein the plurality of training sequences is obtained by precoding, based on a precoding matrix, time domain symbols corresponding to the space-time streams, wherein the precoding matrix is an M×N matrix, M is the quantity of space-time streams, N is the quantity of the plurality of training sequences, and M and N are positive integers.

4. The Wi-Fi communication method according to claim 3, wherein
row vectors in the precoding matrix are orthogonal; and/or
elements in an $(M+1)^{th}$ column to an $N^{th}$ column are the same as elements in a first column to a $j^{th}$ column in the precoding matrix, and the row vectors in the precoding matrix are orthogonal, wherein j is equal to N−M.

5. The Wi-Fi communication method according to claim 3, wherein
the precoding matrix comprises elements in first M rows and first N columns in a reference matrix; or
the precoding matrix is obtained by reconstructing elements in the first M rows and first j columns in the reference matrix, and j is equal to N−M, wherein
the reference matrix is obtained by concatenating at least two specified matrices, each of which is a predefined matrix used to precode the time domain symbols corresponding to the space-time streams.

6. The Wi-Fi communication method according to claim 5, wherein each of the at least two specified matrices is a 4-row and 4-column matrix specified in a Wi-Fi communication protocol, and elements in the matrix are shown as follows:

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

7. The Wi-Fi communication method according to claim 3, wherein before the physical frame is generated, the method further comprises:
determining the precoding matrix based on the quantity of space-time streams, the quantity of the plurality of training sequences, and preset frame format configuration information.

8. The Wi-Fi communication method according to claim 1, wherein when the physical frame is sent, transmit power of at least one of the plurality of training sequences is greater than transmit power of an original training sequence of the at least one of the plurality of training sequences.

9. The Wi-Fi communication method according to claim 1, wherein a transmission resource that carries at least one of the plurality of training sequences further carries data that needs to be transmitted.

10. The Wi-Fi communication method according to claim 1, wherein
the physical frame is a frame generated when a transmit beamforming (TxBF) technology is used and a used modulation scheme is higher than or equal to 4K quadrature amplitude modulation (QAM).

11. The Wi-Fi communication method according to claim 1, wherein
the signaling information is located in a reserved field in the physical frame, and the plurality of training sequences are located in a training sequence field in the physical frame.

12. A Wi-Fi communication method, comprising:
receiving, by a terminal device in a single-user multiple-input multiple-output (MIMO) system, a physical frame from a network device in the single-user MIMO system, wherein the physical frame comprises signaling information and a plurality of training sequences for channel estimation, the signaling information indicates a quantity of space-time streams and a quantity of the plurality of training sequences, and the quantity of the plurality of training sequences is greater than the quantity of space-time streams; and
performing, by the terminal device, channel estimation or frequency offset/phase tracking based on the signaling information and the plurality of training sequences that are comprised in the physical frame,
wherein the performing channel estimation or frequency offset/phase tracking based on the signaling information and the plurality of training sequences at are comprised in the physical frame comprises:
processing the plurality of training sequences in the physical frame based on both the quantity of space-time streams and the quantity of the plurality of training sequences in the signaling information; and
performing channel estimation or frequency offset/phase racking by using a plurality of processed training sequences derived from the processing of th e plurality of training sequences in the physical frame.

13. The Wi-Fi communication method according to claim 12, wherein the performing channel estimation or frequency offset/phase tracking based on the signaling information and the plurality of training sequences that are comprised in the physical frame comprises:
determining a precoding matrix based on preset frame format configuration information, and the quantity of space-time streams and the quantity of the plurality of training sequences that are comprised in the signaling information, wherein the precoding matrix is an M×N matrix, M is the quantity of space-time streams, N is the quantity of the plurality of training sequences, and M and N are positive integers; and after processing the plurality of training sequences based on the precoding matrix, perform channel estimation or frequency offset/phase tracking by using a plurality of training sequences obtained after processing.

14. The Wi-Fi communication method according to claim 13, wherein the quantity of the plurality of training sequences is an integer multiple of the quantity of space-time streams.

15. The Wi-Fi communication method according to claim 13, wherein
row vectors in the precoding matrix are orthogonal; and/or
elements in an $(M+1)^{th}$ column to an $N^{th}$ column are the same as elements in a first column to a $j^{th}$ column in the precoding matrix, and the row vectors in the precoding matrix are orthogonal, wherein j is equal to N−M.

16. A communication device, which is a network device in a single-user multiple-input multiple-output (MIMO) system or is included in the network device, comprising at least one processor, and a memory storing a computer program including instructions that, when executed by the at least one processor, cause the communication device to:
generate a physical frame, wherein the physical frame comprises signaling information and a plurality of training sequences for channel estimation, the signaling information indicates a quantity of space-time streams and a quantity of the plurality of training sequences, and the quantity of the plurality of training sequences is greater than the quantity of space-time streams; and
send the physical frame to a terminal device in the single-user MIMO system, so that the terminal device processes plurality of training sequences in the physical frame based on both the quantity of space-time streams and the quantity of the plurality of training sequences in the signaling information, and performs channel estimation or frequency offset/phase tracking by using a plurality of processed training sequences derived from the processing of the plurality of training sequences in the physical frame.

17. The communication device according to claim 16, wherein the quantity of the plurality of training sequences is an integer multiple of the quantity of space-time streams.

18. The communication device according to claim 16, wherein the plurality of training sequences is obtained by precoding, based on a precoding matrix, time domain symbols corresponding to the space-time streams, wherein the precoding matrix is an M×N matrix, M is the quantity of space-time streams, N is the quantity of the plurality of training sequences, and M and N are positive integers.

19. The communication device according to claim 18, wherein
row vectors in the precoding matrix are orthogonal; and/or
elements in an $(M+1)^{th}$ column to an $N^{th}$ column are the same as elements in a first column to a $j^{th}$ column in the precoding matrix, and the row vectors in the precoding matrix are orthogonal, wherein j is equal to N−M.

20. The communication device according to claim 18, wherein
the precoding matrix comprises elements in first M rows and first N columns in a reference matrix; or
the precoding matrix is obtained by reconstructing elements in the first M rows and first j columns in the reference matrix, and j is equal to N−M, wherein
the reference matrix is obtained by concatenating at least two specified matrices, each of which is a predefined matrix for precoding the time domain symbols corresponding to the space-time streams.

* * * * *